Figure 1:
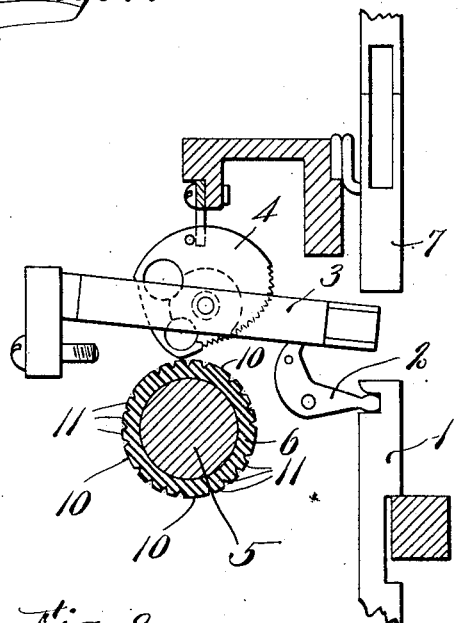

Nov. 15, 1932.     G. H. EBERLEIN     1,887,625

ROLLER FOR LINE SLUG MACHINES

Filed Feb. 28, 1931

Inventor.
George H. Eberlein
by George A. Rockwell,
atty.

Patented Nov. 15, 1932

1,887,625

UNITED STATES PATENT OFFICE

GEORGE H. EBERLEIN, OF CONCORD, MASSACHUSETTS, ASSIGNOR TO STOWE & WOODWARD COMPANY, OF NEWTON UPPER FALLS, MASSACHUSETTS, A CORPORATION OF MASSACHUSETTS

ROLLER FOR LINE SLUG MACHINES

Application filed February 28, 1931. Serial No. 519,071.

My invention is a roller to be used in line slug machines and is especially useful to operate the cam in the keyboard mechanisms of intertype and linotype machines.

The principal objects of my invention are to provide a roller which will provide ample traction and which will be highly durable.

A feature of my invention is the provision of a roller having a plurality of substantially radial projections at the periphery of the roller, the outer portion of each projection being an arc of substantial extent.

Other features will be pointed out below.

In the drawing

Figure 2:
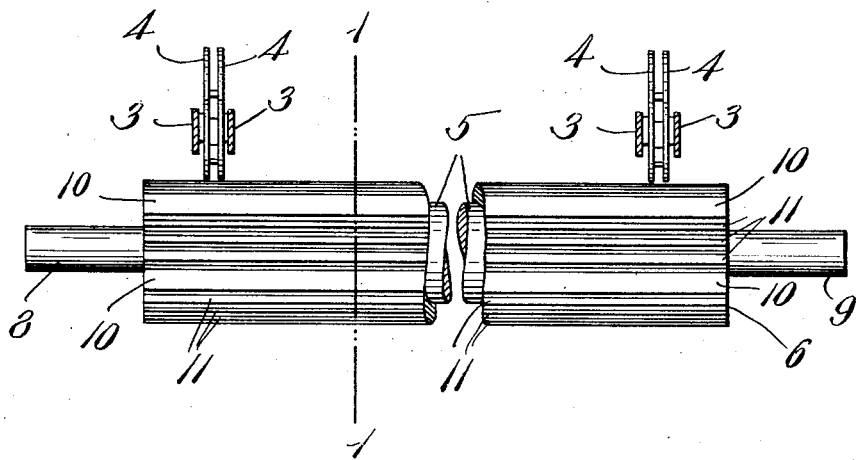

Figure 1 is a partial elevation, partly in section, of a keyboard cam mechanism, the roller, which embodies my mechanism, being in section on line 1—1 of Figure 2; and Figure 2 is an elevation, partly broken away, of a roller embodying my invention, this figure showing also two of the cams (in section) operated by my roller.

I have illustrated my invention in a mechanism of an intertype machine in which the key bar 1 actuates trigger 2 to release yoke 3 carrying cam 4 so that the cam may, when desired, be lowered into engagement with the roller 5—6, the latter rotating cam 4 with the result that the cam will lift key rod 7 to release a matrix (not shown) the mechanism so far described, except the roller 5—6, being well known.

My roller comprises an iron core or shaft 5 having extensions 8 and 9 to serve as bearings and comprises a sleeve 6 of rubber or rubber compound slipped along and frictionally surrounding the core 5 and the sleeve may be vulcanized to the core if desired. The sleeve 6 has, along its periphery, a plurality of projections, each projection being spaced from the adjacent projection by a groove. The outer edge of each projection is an arc of substantial extent, that is, it extends to a substantial extent circumferentially with reference to the axis of the roller. I prefer to provide a plurality of such projections, such as 10, each having its outer arcuate edge substantially greater than the outer arcuate edges of the other projections, such as 11, although as to these latter projections the outer edges are of substantial extent. These projections 10 and 11, and the grooves between adjacent projections, extend longitudinally throughout the length of the sleeve, which is commonly about 15¾ inches long. I have shown two cams 4 merely by way of illustration but in practice there are a large number of cams arranged closely side by side.

The roller is driven by any suitable mechanism and drives the cams when the latter are lowered into engagement with the roller. If the periphery of the roller is a continuous smooth surface there is great likelihood of slipping of the cams, or lack of traction, principally due to the periphery becoming hard or glazed, this being largely because of the traction of the cams, which are usually of brass, on the smooth rubber and because of the oxidation of the rubber by the atmosphere. Such slipping causes a failure of the mechanism to function properly because there is no instant release of a matrix when the appropriate key is depressed.

If the common corrugated roller is used the many protruding fins, which are not arcuate, wear out rapidly and without uniformity, so that some or all of the fins become too small to function properly, this being especially true if the cams are toothed, as shown.

My roller overcomes the objections above referred to, the projections furnishing an excellent wearing surface of great durability because of their arcuate edges and furnishing excellent traction and provides the wearing quality of the roller having a smooth periphery above referred to and provides at the same time the traction of the protruding fins above referred to.

A great advantage of my roller is that while it has the improvements above described it is certainly no more expensive than the rollers now used.

What I claim is:

1. A roller for line slug machines having a plurality of projections in the nature of rubber suitably spaced apart and extending substantially radially of the roller, each projection having its outer edge arcuate with relation to the axis of the roller, said arcuate portions being the only portions available for cooperation with the cam of the machine.

2. A roller for line slug machines having a plurality of projections in the nature of rubber extending substantially radially of the roller, each projection having its outer edge arcuate with relation to the axis of the roller and of relatively large dimension, said projections being spaced apart; and having also one or more projections in the nature of rubber located in said space and extending substantially radially of the roller, each of said one or more projections having its outer edge arcuate with relation to the axis of the roller but of relatively small dimension, said arcuate portions being the only portions available for cooperation with the cam of the machine.

3. A roller for line slug machines having a plurality of projections in the nature of rubber extending substantially radially of the roller, each projection having its outer edge arcuate with relation to the axis of the roller and of relatively large dimension, said projections being spaced regularly apart; and having also a set of three projections in the nature of rubber located in said spaces and extending substantially radially of the roller, each of said set of three projections having its outer edge arcuate with relation to the axis of the roller but of relatively small dimension, the arcuate dimension of the edges of said set of three projections being substantially equal and the sum of the arcuate dimensions of the edge of two of said set being substantially the same as the arcuate dimension of the edge of one of said plurality of projections; and having grooves between adjacent projections, said grooves and projections extending longitudinally throughout substantially the entire length of the roller, said arcuate portions being the only portions available for cooperation with the cam of the machine.

GEORGE H. EBERLEIN.